United States Patent [19]

Quang et al.

[11] Patent Number: 4,840,783
[45] Date of Patent: Jun. 20, 1989

[54] PROCESS FOR THE PRODUCTION OF HYDROGEN BY CATALYTIC REFORMING OF METHANOL WITH WATER VAPOR

[75] Inventors: Dang Vu Quang, Neuilly; Michel Davidson, Le Vesinet; Daniel Durand, Rueil-Malmaison; Philippe Courty, Houilles, all of France

[73] Assignee: Institut Francais du Petrole, Rueil-Malmaison, France

[21] Appl. No.: 133,843

[22] Filed: Dec. 16, 1987

[30] Foreign Application Priority Data

Dec. 16, 1986 [FR] France ............................. 86 17712

[51] Int. Cl.$^4$ ............................................. C01B 1/05
[52] U.S. Cl. ................................................ 423/648.1
[58] Field of Search ........................... 423/648 R, 648.1

[56] References Cited

U.S. PATENT DOCUMENTS

| | | | |
|---|---|---|---|
| 2,425,625 | 8/1947 | Larson | 423/648 R |
| 4,091,086 | 5/1978 | Hindin et al. | 423/648 R |
| 4,316,880 | 2/1982 | Jockel et al. | 423/648 R |
| 4,692,322 | 9/1987 | Möller et al. | 423/648 R |
| 4,743,576 | 5/1988 | Schneider et al. | 423/648.1 |
| 4,780,300 | 10/1988 | Yokoyama et al. | 423/648.1 |
| 4,789,540 | 12/1988 | Jenkins | 423/648.1 |

FOREIGN PATENT DOCUMENTS

| | | | |
|---|---|---|---|
| 1010574 | 11/1965 | United Kingdom | 423/648 R |
| 1151267 | 5/1969 | United Kingdom | 423/648 R |

Primary Examiner—John Doll
Assistant Examiner—Wayne A. Langel
Attorney, Agent, or Firm—Millen, White & Zelano

[57] ABSTRACT

The invention relates to a process for the production of hydrogen by catalytic reforming of methanol with water vapor. A mixture of methanol, water and carbon dioxide is passed in contact with a catalyst, containing copper, in a fixed bed, in a catalytic zone, at a temperature comprised between 150° and 400° C., the molar ratio of the carbon dioxide to the methanol, at the entrance of the catalytic zone, being comprised between 0.001 and 0.2.

19 Claims, 1 Drawing Sheet

PROCESS FOR THE PRODUCTION OF HYDROGEN BY CATALYTIC REFORMING OF METHANOL WITH WATER VAPOR

BACKGROUND OF THE INVENTION

The present invention relates to a process for the production of hydrogen by catalytic reforming of methanol with water vapor.

The process produces hydrogen with carbon dioxide as the principal impurity.

At the present time it is known that the major part of the hydrogen used in the world comes from the catalytic reforming of natural gas.

The latter is not always available at the desired location. Also, for the limited needs of some places, it is preferred to start from liquid charges more easily storable than methanol.

The production of hydrogen from methanol is based on the well-known reaction (FR-1549 206 and 1599 852) of reforming methanol with steam:

$$CH_3OH + H_2O \rightleftharpoons CO_2 + 3H_2 \quad (1)$$

which can theoretically be employed in the presence of any one of the catalysts already proposed for the reverse reactions of methanol synthesis:

$$CO + 2H_2 \rightleftharpoons CH_3OH \quad (2)$$

$$CO_2 + 3H_2 \rightleftharpoons CH_3OH + H_2O \quad (3)$$

In practice however when it is sought to reform methanol, an accelerated deactivation of the catalytic system is experienced. The same observation has been made by the applicants of Belgian Pat. No. 884720 who propose to remedy this either by the use of modified catalysts, less active at low temperature, or by the use of a particular starting method, or lastly by the use of two successive catalyst beds, one for performing the cracking of the methanol according to the reverse reaction (4) from reaction (2):

$$CH_3OH \rightleftharpoons CO + 2H_2 \quad (4)$$

the other for converting the carbon monoxide obtained:

$$CO + H_2O \rightleftharpoons CO_2 + H_2 \quad (5)$$

It has now been found that the employment of these measures is not necessary and that it suffices to avoid the deactivation of a catalyst containing copper, to add a critical proportion of carbon dioxide to the reagents, water and methanol, before putting them into contact witht he catalyst.

It is known that the massive injection of $CO_2$ into the reforming system of methanol with steam is an effective though expensive means for increasing the ratio $CO/H_2$ of the synthesis gas manufactured.

Thus, the Belgian patent alreay cited teaches that, by varying the molar ratio $CO_2$ to methanol between 0.8 and 2.4, it is possible to change the content of CO of the manufactured gas from 31 to 41% by volume approximately, with a simultaneous lowering of the yield of hydrogen.

GENERAL DESCRIPTION OF THE INVENTION

It is an object of the invention to provide a method for the production of hydrogen, while avoiding as far as possible the formation of carbon monoxide which is a very heavy consumer of hydrogen, as shown by equation (6), the reverse of (5):

$$CO_2 + H_2 \rightleftharpoons CO + H_2O \quad (6)$$

According to the invention, this problem is solved in the following manner:

A mixture of methanol, of water and of carbon dioxide are passed into contact with a catalyst containing copper, in a fixed bed, in a catalytic zone at a temperature comprised between 150° to 400° C., preferably between 180° to 290° C., the molar ratio of the carbon dioxide to the methanol, at the entrance of the catalytic zone, being comprised between 0.001 and 0.2, preferably between 0.01 and 0.15.

When hydrogen is present, at the same time as $CO_2$, the molar ratio of the hydrogen to the methanol, at the entrance of the catalytic zone, is advantageously from 0 to 3, preferably from 0 to 1.

Too low a content of $CO_2$ and/or an excessive proportion of hydrogen do not permit good stability of the copper containing catalyst to be ensured.

Too high a content of $CO_2$ is, on the other hand, prejudicial to the productivity of the process.

In a preferred embodiment, processing is carried out between 180° and 290° C., a range wherein the yield of hydrogen is a maximum and where the presence of $CO_2$ shows itself to be very useful to reduce or eliminate the loss of activity of the catalyst.

The carbon dioxide, used in the process of the invention may be either a pure gas, or a $CO_2$-rich gas, and preferably a gas whose principal impurity is hydrogen, for example, a gas formed of 25–100% $CO_2$ and 75–0% $H_2$ in moles, preferably 60–100% $CO_2$ and 40–0% $H_2$ and more particularly 65–96% $CO_2$ and 35–5% $H_2$.

It is possible to operate under a pressure of for example, 0.1 to 20 MPa, preferably 0.2 to 10 MPa.

According to equation (1), the ratio between the water and the methanol must be equal to at least one mole per mole, for example, 1.1 to 10 moles per mole, preferably 1.2 to 4 moles per mole.

The hourly space velocity (H.S.V.)—ratio between the hourly liquid flow rate by volume of methanol and the volume of catalyst—is comprised between 0.1 and 30 and preferably between 0.2 and 10.

The catalyst contains copper, preferably associated with one or several elements such as zinc, aluminum of chromium, in the form of mixed oxides or again of a mixture in various proportions of the simple constituent oxides. A preferred composition comprises 50–75% CuO, 20–40% ZnO and 5–15% $Al_2O_3$, by weight.

The catalyst contains preferably other elements such as iron, manganese or cobalt.

In particular, the presence of iron oxide in a mixture of copper oxide and chromium oxide improves the productivity of the catalytic system.

A preferred catalyst contains 40–75% CuO, 20–45% $Fe_2O_3$ and 5–25% $Cr_2O_3$, by weight.

The catalysts may be either solid, that is to say, constituted by oxides of the active elements, or supported.

Their binders or their supports may be, for example, silica, alumina, a mixture of these two materials, a more complex support such as aluminates with a spinel structure (an aluminate of magnesium, of zinc, of iron or of cobalt) or a perowskite structure, (aluminates of rare earths of atomic numbers 57 to 71 inclusive) or again, constituted of mixed oxides based on zirconia ($ZrO_2$-MgO, $ZrO_2$-rare earths, etc. . . ).

Certain of these catalysts have been described, for example, in patents FR No. 1549301, Fr, No. 1599852, U.S. Pat. No. 4,552,861 and U.S. Pat. No. 4,596,782).

DESCRIPTION OF PREFERRED EMBODIMENTS

Figure 1:
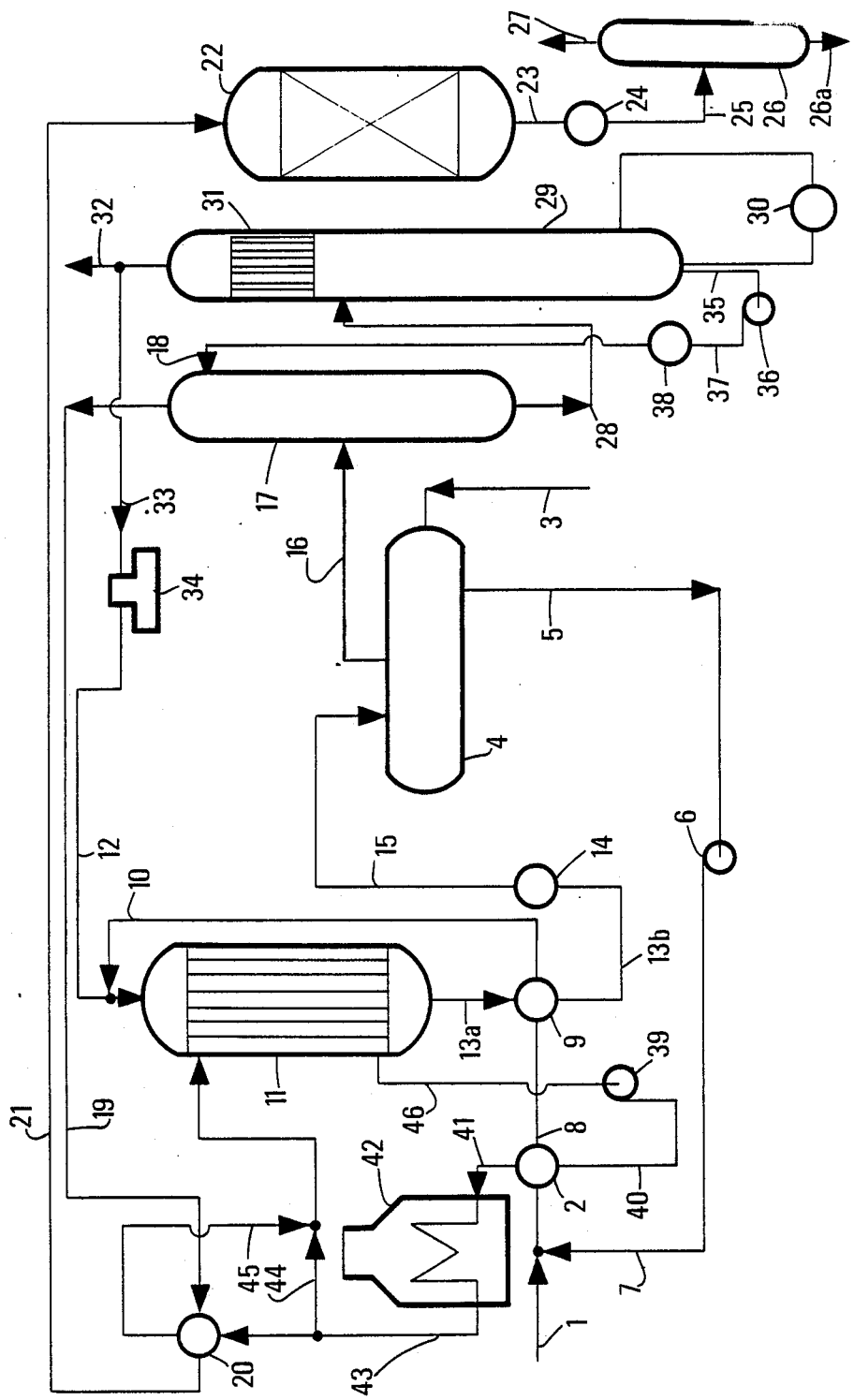
FIG. 1 illustrates a first embodiment of the process according to the invention.

Liquid methanol is introduced through pipe 1 into the reforming unit and at the same time, the liquid water necessary for the reforming is introduced through the pipe 3 into the flask 4 where it is if necessary mixed with water and with methanol which have not reacted. This mixture arrives through the pipe 5, the pump 6 and the pipe 7 into the duct 1 where it encounters the added methanol. This pipe 1 ends at the exchanger 2 whose purpose is to vaporize the liquid charges of the unit.

All of the agents, vaporized by 2, pass to the superheater 9 through the pipe 8.

At the exit from 9, the charges are brought through the pipe 10 to the reactor 11.

In the pipe 10, arrives carbon dioxide coming from the pipe 12.

Reactor 11 is, for example, an exchanger reactor whose tubes are filled on the inside by the catalyst and regulated thermally on the outside, by a flow of heat conveying fluid.

It is known in fact, that the reaction 1 is a globally endothermic reaction and that to be able to reform 1 kmole of alcohol, it must provide to it about 50,000 kjoules.

It is preferred to operate at a temperature difference between the inlet and the outlet of the one or more catlaytic beds of less than 100° C., and preferably less 50° C.

From the reactor 11, the effluent products formed pricipally of hydrogen, of carbon dioxide and a small amount of carbon monoxide, water and methanol which have not been converted, emerge through the pipe 13a to be brought to the exchanger 9.

From 9 through the pipe 13b, these products are led to the exchanger 14 where the unconverted reagents are recondensed.

The gas-liquid mixture arrives through the pipe 15 at the separator flask 4.

In 4, the condensate rejoins the fresh water of addition to be sent to the reactor.

The uncondensable gases emerge through the pipe 16, and enter the washing column 17.

From the top of the column 17, there is sent through the pipe 18, a flow of solvent intended to absorb the $CO_2$ contained in the gas.

The solvent is any one of the solvents known for this use, for example, a solution of alkali metal carbonate or an amine solution.

Column 17 is usefully provided with a conventional contacting device such as plates with perforations or with valves, a packing such as Raschig rings or Pall rings, etc. . .

At the top of the column 17, the gas, formed essentially of hydrogen freed from $CO_2$, emerges through the pipe 19. If it is desired to further purify this hydrogen, it can be reheated in the exchanger 20 and directed through the pipe 21 to the methanization reactor 22.

In this reactor, the CO, which can constitute a poison for subsequent uses of the hydrogen, is converted into methane and water.

This water is condensed by the exchanger 24 where the gases arrive through the pipe 23.

The gas mixture, plus condensate, emerges from 24 through the pipe 25 which opens into the separator 26. The condensate is removed through the pipeline 26a.

At the top of 26, the purified hydrogen is sent to the users through the pipe 27.

The solvent charged with $CO_2$ is sent through the pipe 28 into the column 29 where it is regenerated by heating by means of the reboiler 30.

The $CO_2$ revaporized by 30 reascends the column 29 and traverses the exchangers 31 which frees it from solvent entrained by condensation.

It is finally evacuated from the unit through the pipe 32.

A part of this $CO_2$ is however taken up by means of the branch pipe 33.

This $CO_2$ is taken up again by the compressor 34 to be sent through the pipe 12 into the reactor 15, in a mixture with the fresh charge.

The regenerated solvent collected at the bottom of the column 29, passes through the pipe 35, is taken up by the pump 36 which sends it through the pipe 37 to the cooler 38.

From 38, it rejoins the washing or absorption column 17, through the pipe 18.

The heat necessary for the endothermic reforming reaction may be supplied by a heat transmitting fluid the flow of which is ensured by the pump 39.

From 39, through the pipe 40, the fluid arrives to vaporize the liquid charges through the exchanger of 2.

From 2, through the pipe 41, it arrives at the furnace 42 whence it emerges reheated through the pipe 43.

In 43, the fluid is divided into two. One part through 44 comes to heat the reactor 11 directly.

A second part comes to the methanization preheater 20 and then rejoins the reactor 11 by means of the pipe 45.

In the unit thus described, the $CO_2$ necessary for the stability of the catalyst is injected into the reactor 11 by means of a compressor 34.

This is an apparatus, expensive to acquire, and which demands constant supervision, difficult to ensure when it relates to capacities of small size.

Figure 2:
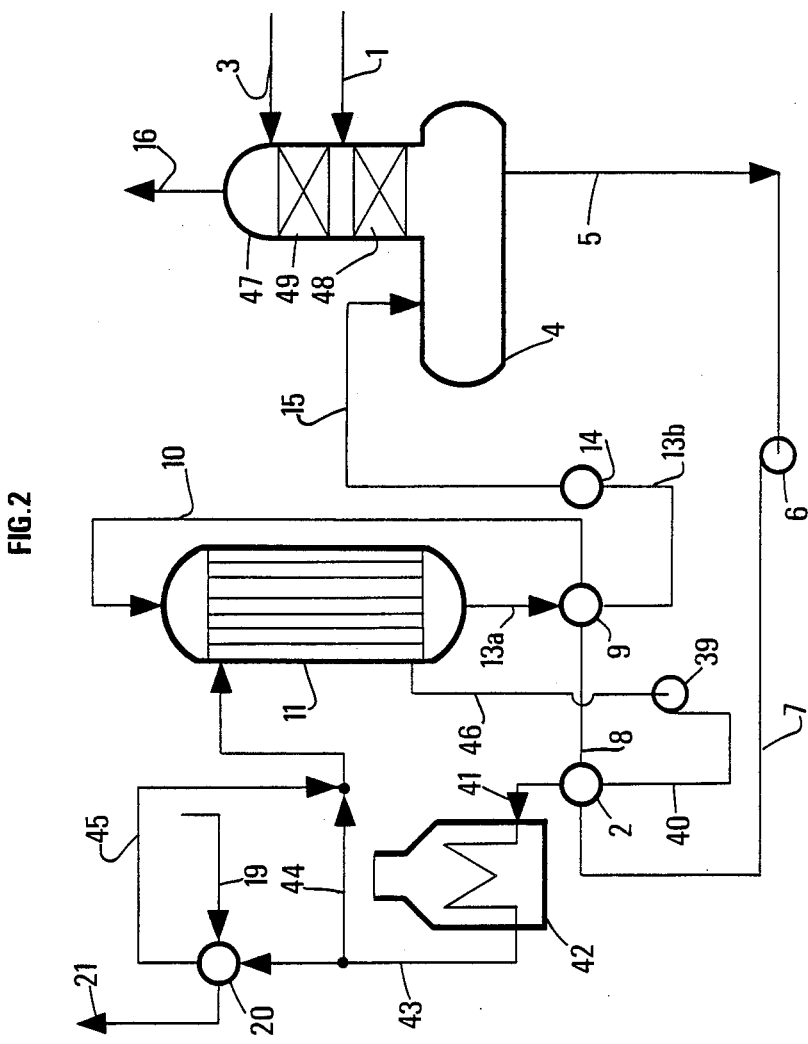
FIG. 2 illustrates a modification of the embodiment of FIG. 1.

A modification of the process is shown in FIG. 2.

In this modification, a portion of the methanol from the pipe 1 is sent first into the column 47 equipped with two gas-liquid contacting zones 48 and 49.

The fresh methanol introduced through 1 sprays the contacting zone 48 traversed from bottom to top by the crude gas mixture, freed previously from liquid condensates by means of the separating balloon flask 4.

The second gas-liquid contacting zone 49 located above 48 is sprayed by at least a portion of the fresh make-up water coming from the pipe 3.

The contacting zone 48 is for the purpose of saturating the fresh liquid methanol and water charges with $CO_2$.

The contacting zone 48 has a double purpose: to partly saturate with $CO_2$, the fresh make-up water and to trap the methanol vapor drawn off by this gas during the liquid-gas contacting in the zone 48.

The contacting zones 48, 49 may contain, for example, perforated or valved trays, or a packing of Raschig or Pall rings etc...

In FIG. 2, the column 47 is mounted directly on the top of the balloon flask 4, but it is however possible to construct 4 and 47 as separate elements joined by suitable pipes.

The liquids collected are, at least in part, sent to the reactor 11.

In a modification, the column 47 comprises a wahsing zone in which the effluent gas is washed by a water plus methanol mixture, which may be constituted by the fresh reagent charge.

This charge dissolves carbon dioxide and is then sent to the reforming reactor for the methanol.

It is also possible to bubble the effluent gases into a liquid phase formed by methanol, by water or by a methanol plus water mixture.

EXAMPLE 1 (Comparative example without $CO_2$)

A conventional catalyst for synthesis of methanol is selected with the following composition by weight:

| OXIDES | % weight |
| --- | --- |
| CuO | 61.0 |
| $Al_2O_3$ | 7.85% wt |
| ZnO | 31.15 |

70 $cm^3$ of this catalyst is charged into a tubular reactor of diameter 20 mm and over a height of bed or 250 mm.

The catalyst is reduced at atmospheric pressure with a mixture of 3% hydrogen in nitrogen between 100° and 270° C. for 72 hours.

After the reduction step, the unit is pressurized at 3 MPa. There is then injected, at 270° C., the water-methanol reaction mixture (molar ratio $H_2O/CH_3OH = 1.5$) at a flow rate of 105 $cm^3$/hour; the liquid space velocity being 1.5 $h^{-1}$. The catalytic bed is kept at 270° C. (input) and 260° C. (output).

The composition by volume of the effluent gas is as follows:

| Constituents | % volume |
| --- | --- |
| CO | 1.7 |
| $CO_2$ | 23.7 |
| $CH_4$ | 0.1 |
| $CH_3OH$ | 0.1 |
| $H_2$ | 74.4 |

The conversion proportion of methanol after 24 hours of operation is 88% but, after 10 days of operation it is no more than 78%.

In Example 1, as in the following examples 2 to 6, the yield of hydrogen is 97%, calculated with respect to the methanol converted.

EXAMPLE 2

The catalyst and the operating conditions remaining the same as those of Example 1, there is injected in cocurrent with the water-methanol charge, carbon dioxide, at an hourly flow rate of liter/hour. The partial pressure of the carbon dioxide at the input of the catalytic bed was 0.063 MPa and the reagent molar ratios $CO_2/CH_3OH$ and $CO_2$/reactants were respectively equal to 0.0536 and to 0.0210. Under these conditions the conversion of the methanol (86% on the first day) was established at 87% at the third day and then barely varied until the end of the test (tenth day).

EXAMPLE 3

The same operating conditions were used as in Example 2, but with a flow rate of $CO_2$ of 7 liter/hour, namely at the input of the reactor:
- a partial pressure of $CO_2$ of: 0.209 MPa
- a molar ratio $CO_2/CH_3OH$ of: 0.1876
- a molar ratio $CO_2$/reagents of: 0.0698 The conversion level of the methanol was practically stabilized at 92%, on the tenth day of the test.

EXAMPLE 4

The same experiment as that of Example 1 was repeated, but by introducing at the same time as the water-methanol charge a $H_2$—$CO_2$ mixture with 39.1% volume of hydrogen and 60.9% volume of $CO_2$ and at a flow rate of 11.5 l/h.

The values of the partial pressures and of the molar ratios are as follows:

| | |
| --- | --- |
| $pCO_2 = 0.2$ MPa | $PH_2 = 0.129$ MPa |
| $CO_2/H_2 = 1.556$   $CO_2/CH_3OH = 0.1876$ | $CO_2/H_2O = 0.125$ |

It is observed, by comparison with Example 1, that there is an improvement in the stability (drop in conversion of 0.25 unit daily approximately instead of one unit) and of catalytic activity (94% of conversion of the methanol instead of 88% on the first day). However, this stabilizing effect of the catalytic activity by the $H_2$—$CO_2$ mixture is appreciably less than that of $CO_2$ alone (Example 3).

EXAMPLE 5

Operations were under the same conditions as those of Example 1 however by introducing with the reagents a $H_2$—$CO_2$ mixture with 75.0 molar % of hydrogen and 25.0% of $CO_2$ and a flow rate of 8 l/h.

The values of the different molar ratios were as follows:

$CO_2/H_2 = 0.333$, $CO_2/CH_3OH = 0.0536$

The conversion of the methanol was 89% after 24 hours. It then dropped on the average by 0.75 point daily. This shows that the stabilizing effect of the injection of an $H_2$—$CO_2$ mixture with the molar ratio $H_2/CO_2$ of 3 is much weaker than that obtained with mixtures richer in $CO_2$ (Examples 2 and 3).

EXAMPLE 6

Witha catalyst of composition by weight:

| | |
| --- | --- |
| CuO = 50.32 | |
| $Fe_2O_3$ = 33.82 | % weight |
| $Cr_2O_3$ = 15.86 | | the same type of test as in Example 2 was carried out with the difference that the reaction temperature was 265° C, and the flow rate of $CO_2$ was 5 l/h. The conversion levels of the methanol are given in the Table below and compared with those obtained in the absence of $CO_2$.

| | Conversion level of the methanol (%) | |
|---|---|---|
| | 1st day | 10th day |
| without $CO_2$ | 88.6 | 79.2 |
| with $CO_2$ | 88.1 | 87.3 |

As in the case of the Cu-Al-Zn catalyst, there is observed, for the Cu-Fe-Cr catalyst, a beneficial effect of the injection of $CO_2$ at the head of the reactor, on the stability and on the catalytic activity.

We claim:

1. A process for the production of hydrogen by catalytic reforming of methanol with steam, said process comprising admixing methanol, $H_2O$ and carbon dioxide to form a feed mixture and delivering said feed mixture into contact with a catalyst containing copper, in a fixed bed, in a catalytic zone, at a temperature comprised between 150° to 400° C., wherein the molar ratio of the carbon dioxide to the methanol, at the input of the catalytic zone, is comprised between 0.01–0.14 and the water/methanol ratio is 1.1–10 moles per mole.

2. A process according to claim 1, wherein the mixture of methanol, water and carbon dioxide contains in addition hydrogen and the molar ratio of the hydrogen to the methanol, at the input of the catalytic zone, is 0 to 3.

3. A process according to claim 1, wherein the temperature of the catalyst is 180° to 290° C.

4. A process according to claim 2, wherein the carbon dioxide and the hydrogen are simultaneously present in the feed mixture, in proportions of 25–100% $CO_2$ and 75–0% $H_2$.

5. A process according to claim 2, wherein the carbon dioxide and the hydrogen are simultaneously present in the feed mixture, in proportions of 60–100% $CO_2$ and 40–0% $H_2$.

6. A process according to claim 2, wherein the carbon dioxide and hydrogen are simultaneously present in the feed mixture, in proportions of 65–95% $CO_2$ and 35–5% $H_2$.

7. A process according to claim 1, wherein the difference in temperature between the input and the output of the (one or more catalytic beds) is less than 50° C.

8. A process according to claim 1, comprising cooling the effluent from the catalytic zone, so as to condense the unreacted water and methanol, separating the resulting condensate from the uncondensed gas, containing hydrogen and carbon dioxide, washing the uncondensed gas first by at least one portion of the fresh liquid methanol and then by at least one portion of the fresh liquid water, discharging the resultant hydrogen-rich gas, and sending to the catalytic zone at least a portion of the condensate and at least a portion of the liquid phases resulting from the washings of the uncondensed gas by the liquid methanol and by the liquid water.

9. A process according to claim 1, comprising cooling the effluent from the catalytic zone, so as to condense the water and the methanol which have not reacted, separating the resultant condensate from the uncondensed gas, containing hydrogen and carbon dioxide, washing the uncondensed gas by a mixture of water and fresh methanol, discharging the resultant hydrogen-rich gas and sending to the catalytic zone at least a portion of the condensate and at least a portion of the liquid phase resulting from the washing of the uncondensed gas by the mixture of water and of fresh methanol.

10. A process according to claim 1, wherein the catalyst contains 40–75% CuO, 20–45% $Fe_2O_3$ and 5–25% $Cr_2O_3$ by weight.

11. A process according to claim 1, wherein the process is operated at a pressure of 0.1–20 MPa.

12. A process according to claim 1, wherein the water/methanol ratio is 1.2–4 moles per mole.

13. A process according to claim 1, wherein the ratio of the hourly liquid volumetric flow rate of methanol to the volume of catalyst is about 0.1–30.

14. A process according to claim 1, wherein said catalyst contains in addition to copper at least one of the elements of zinc, aluminum or chromium.

15. A process according to claim 1, wherein the catalyst contains 50–75% CuO, 20–40% ZnO and 5–15% $Al_2O_3$.

16. A process according to claim 1, wherein the fixed bed of copper-containing catalyst comprises catalyst-filled reactor tubes.

17. A process according to claim 1, further comprising cooling the effluent from the catalytic zone to condense unreacted water and methanol; separating the resultant condensate from the uncondensed gas and recycling the unreacted condensed water and methanol to the admixing step wherein the feed mixture is formed.

18. A process according to claim 1, further comprising cooling the effluent from the catalytic zone to condense unreacted water and methanol; separating the resultant condensate from the uncondensed gas, said uncondensed gas containing hydrogen and carbon dioxide; washing the uncondensed gas with an absorbent to remove $CO_2$ and delivering the resultant washed gas to a methanization reactor to convert carbon monoxide into methane and water.

19. A process according to claim 1, wherein the feed mixture is formed by passing a stream of $CO_2$ into a stream containing $H_2O$ and methanol.

* * * * *